US011982392B2

(12) United States Patent
Lundman

(10) Patent No.: US 11,982,392 B2
(45) Date of Patent: May 14, 2024

(54) FLOW RESTRICTION SYSTEM

(71) Applicant: Petersen Resources, LLC, Fredonia, WI (US)

(72) Inventor: Philip L. Lundman, Fredonia, WI (US)

(73) Assignee: Petersen Resources, LLC, Fredonia, WI (US)

( * ) Notice: Subject to any disclaimer, the term of this patent is extended or adjusted under 35 U.S.C. 154(b) by 160 days.

(21) Appl. No.: 17/336,598

(22) Filed: Jun. 2, 2021

(65) Prior Publication Data

US 2021/0404591 A1 Dec. 30, 2021

Related U.S. Application Data

(60) Provisional application No. 63/044,692, filed on Jun. 26, 2020.

(51) Int. Cl.
*F16L 55/124* (2006.01)
*F16L 55/11* (2006.01)

(52) U.S. Cl.
CPC ......... *F16L 55/124* (2013.01); *F16L 55/1108* (2013.01)

(58) Field of Classification Search
CPC . F16K 7/10; F16L 41/086; F16L 41/14; F16L 55/105; F16L 55/124; F16L 55/134
USPC ................................ 138/90, 93, 94; 285/205
See application file for complete search history.

(56) References Cited

U.S. PATENT DOCUMENTS

| | | | | |
|---|---|---|---|---|
| 580,689 A | * | 4/1897 | Hearn | F16L 55/134 220/303 |
| 827,835 A | * | 8/1906 | White | F16L 55/134 138/93 |
| 1,151,514 A | * | 8/1915 | Donohue | F16L 55/124 138/94 |
| 1,506,418 A | * | 8/1924 | Evensta | F16K 7/10 138/93 |
| 2,073,740 A | * | 3/1937 | Gardner | F16L 55/124 138/94 |
| 2,568,301 A | * | 9/1951 | Pottberg | F16L 41/14 285/348 |
| 4,203,473 A | * | 5/1980 | Roberson, Sr. | F16K 7/10 4/256.1 |

(Continued)

FOREIGN PATENT DOCUMENTS

| | | | | |
|---|---|---|---|---|
| GB | 2120340 A | * | 11/1983 | ............. F16L 41/14 |
| GB | 2241548 A | * | 9/1991 | ............. F16L 41/14 |

*Primary Examiner* — David R Deal
(74) *Attorney, Agent, or Firm* — Michael Best & Friedrich LLP

(57) ABSTRACT

A flow restriction system is provided for restricting fluid flow through a pipe. The flow restriction system includes an anchor and an inflatable plug. The anchor includes an inflation conduit, a head, and a foot. The inflation conduit has a first end, a second end, and a passage. The second end is opposite the first end. The passage extends from the first end toward the second end. The head is coupled to the first end of the inflation conduit. The head includes an opening in fluid communication with the passage. The foot is coupled to the second end of the inflation conduit. The inflatable plug is coupled to the anchor. The inflatable plug includes an interior chamber. The interior chamber is in fluid communication with the passage. The head and the foot are configured to engage diametrically opposed sections of the pipe.

15 Claims, 13 Drawing Sheets

(56) References Cited

U.S. PATENT DOCUMENTS

| | | | | |
|---|---|---|---|---|
| 4,291,727 | A * | 9/1981 | Yie | F16L 55/124 |
| | | | | 408/121 |
| 4,509,343 | A * | 4/1985 | Brister | F25D 3/10 |
| | | | | 137/317 |
| 5,503,188 | A * | 4/1996 | Petrone | F16L 55/124 |
| | | | | 138/121 |
| 2003/0178843 | A1 * | 9/2003 | McAliley | F16L 41/14 |
| | | | | 285/114 |
| 2008/0163951 | A1 * | 7/2008 | Lundman | F16L 55/1286 |
| | | | | 138/93 |

* cited by examiner

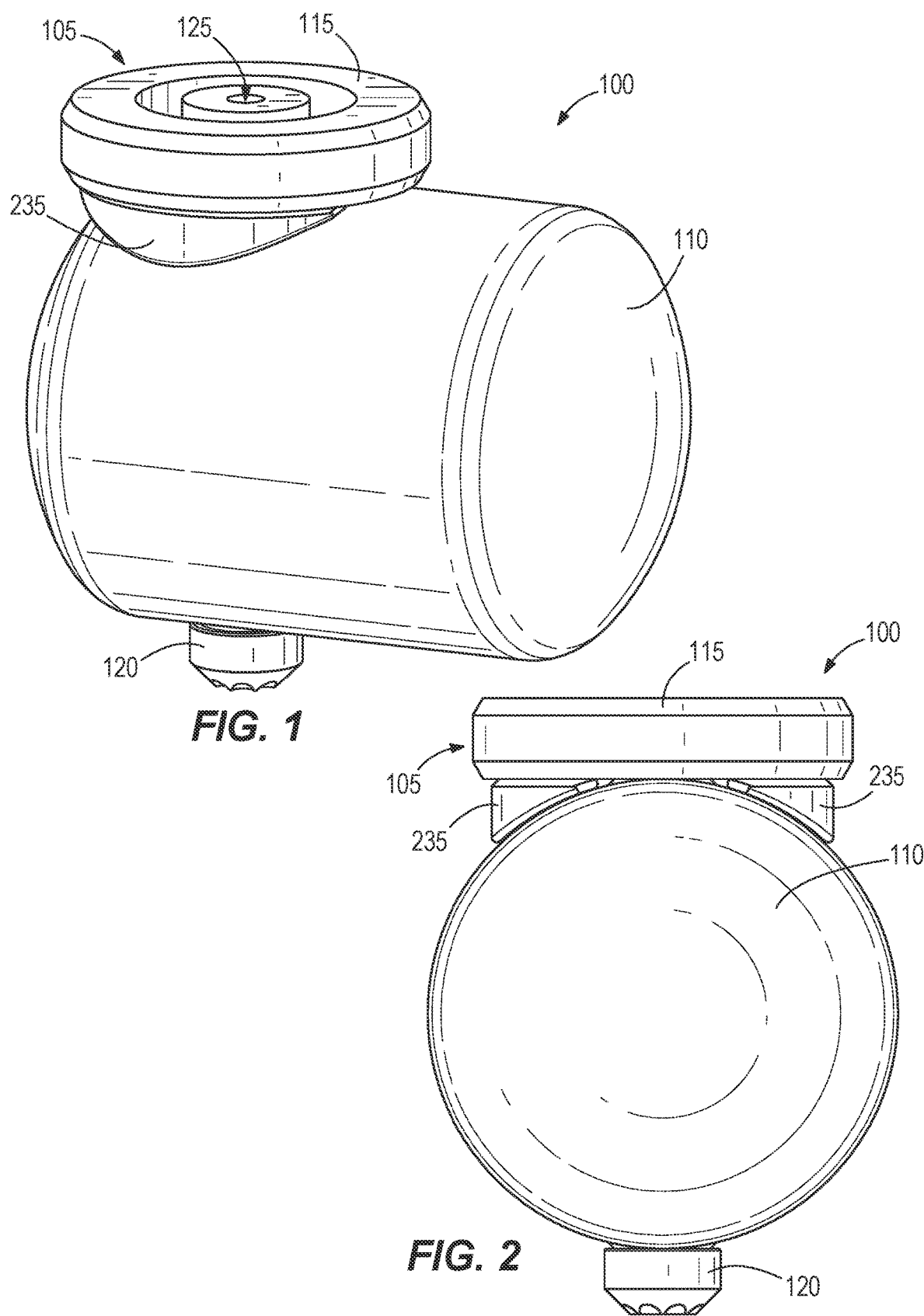

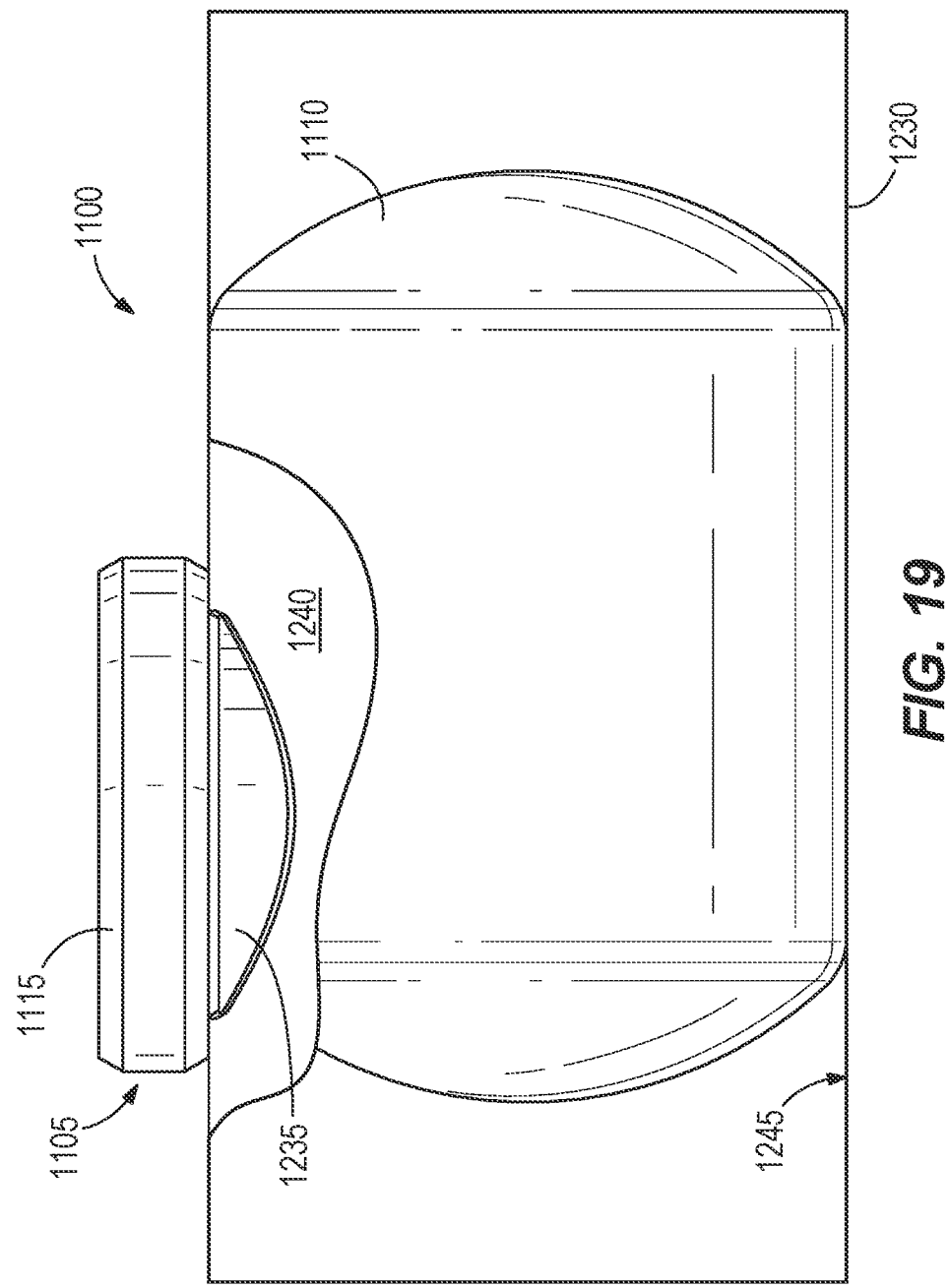

US 11,982,392 B2

FLOW RESTRICTION SYSTEM

CROSS-REFERENCE TO RELATED APPLICATIONS

This application claims the benefit of U.S. Provisional Application No. 63/044,692 filed Jun. 26, 2020, the entire contents of which are incorporated by reference herein.

TECHNICAL FIELD

The present disclosure generally pertains to plugs for fluid conduits.

BACKGROUND

The present disclosure relates to a flow restriction system, or pipe sealing apparatus, that is insertable into pipelines of varying diameters and is inflatable therein to seal a section of pipeline with internal fluid flow. Such a pipe sealing apparatus is sometimes referred to as an inflatable flow stop plugging system.

Inflatable plugs provide a useful means to mitigate the uncontrolled release of fluids from a pipeline when a break occurs in the pipeline or when downstream repairs are required. Inflatable plugs are also used for plugging fluid conduits, such as sewer lines, gas lines, or oil pipelines to permit maintenance, facilitate toxic waste containment, or remove blockages. Such plugs couple to fluid lines to facilitate inflation and deflation within the conduits.

SUMMARY

In one aspect, the disclosure provides a flow restriction system for restricting fluid flow through a pipe. The flow restriction system includes an anchor and an inflatable plug. The anchor includes an inflation conduit, a head, and a foot. The inflation conduit has a first end, a second end, and a passage. The second end is opposite the first end. The passage extends from the first end toward the second end. The head is coupled to the first end of the inflation conduit. The head includes an opening in fluid communication with the passage. The foot is coupled to the second end of the inflation conduit. The inflatable plug is coupled to the anchor. The inflatable plug includes an interior chamber. The interior chamber is in fluid communication with the passage. The head and the foot are configured to engage diametrically opposed sections of the pipe.

In another aspect, the disclosure provides a method of restricting fluid flow through a pipe. The method includes installing an anchor through an opening in a wall of the pipe, engaging a portion of the wall with a foot of the anchor, securing a head of the anchor to the pipe such that the head is disposed at least partially outside the pipe, and inflating an inflatable plug coupled to the anchor.

In another aspect, the disclosure provides a flow restriction system for restricting fluid flow through a pipe. The flow restriction system includes an anchor and an inflatable plug. The anchor includes a rigid elongate inflation conduit, a generally circular head, and a foot. The rigid elongate inflation conduit has a first end, a second end opposite the first end, a passage extending from the first end toward the second end, and at least one fluid delivery port defined in a wall of the inflation conduit between the first end and the second end. The generally circular head is removably coupled to the first end of the inflation conduit. The head includes a circular opening in fluid communication with the passage. The circular opening has a center point that is coincident with a center point of the generally circular head. The head is made to be disposed outside of the pipe. The foot is removably coupled to the second end of the inflation conduit. The inflatable plug is coupled to the anchor adjacent the head by a plate assembly with fasteners extending through the inflatable plug. The inflatable plug includes an interior chamber. The interior chamber is in fluid communication with the passage through the at least one fluid delivery port. The head and the foot are made to engage diametrically opposed sections of the pipe.

Other aspects of the disclosure will become apparent by consideration of the detailed description and the accompanying drawings.

BRIEF DESCRIPTION OF THE DRAWINGS

FIG. 1 is a perspective view of an embodiment of a fluid restriction system.

FIG. 2 is a front elevation view of the fluid restriction system of FIG. 1.

FIG. 19 is a side elevation view of the fluid restriction system of FIG. 15 placed in a pipe.

DETAILED DESCRIPTION

Figure 3:
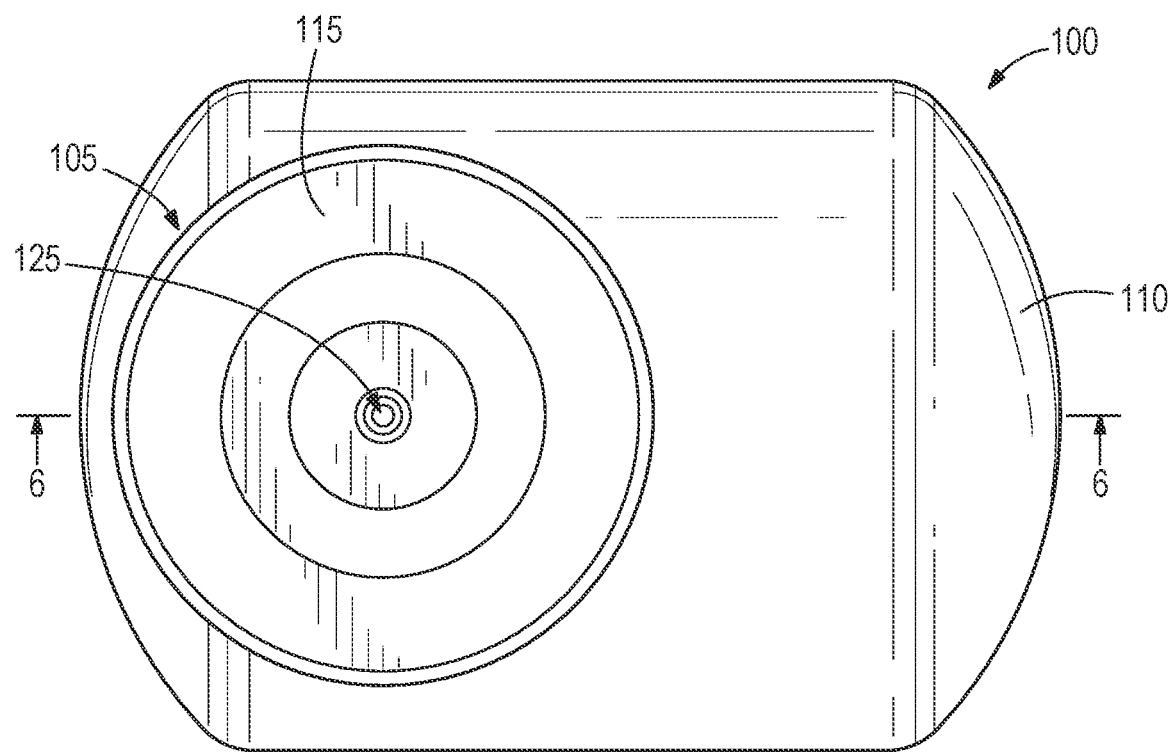
FIG. 3 is a top plan view of the fluid restriction system of FIG. 1.
Figure 4:
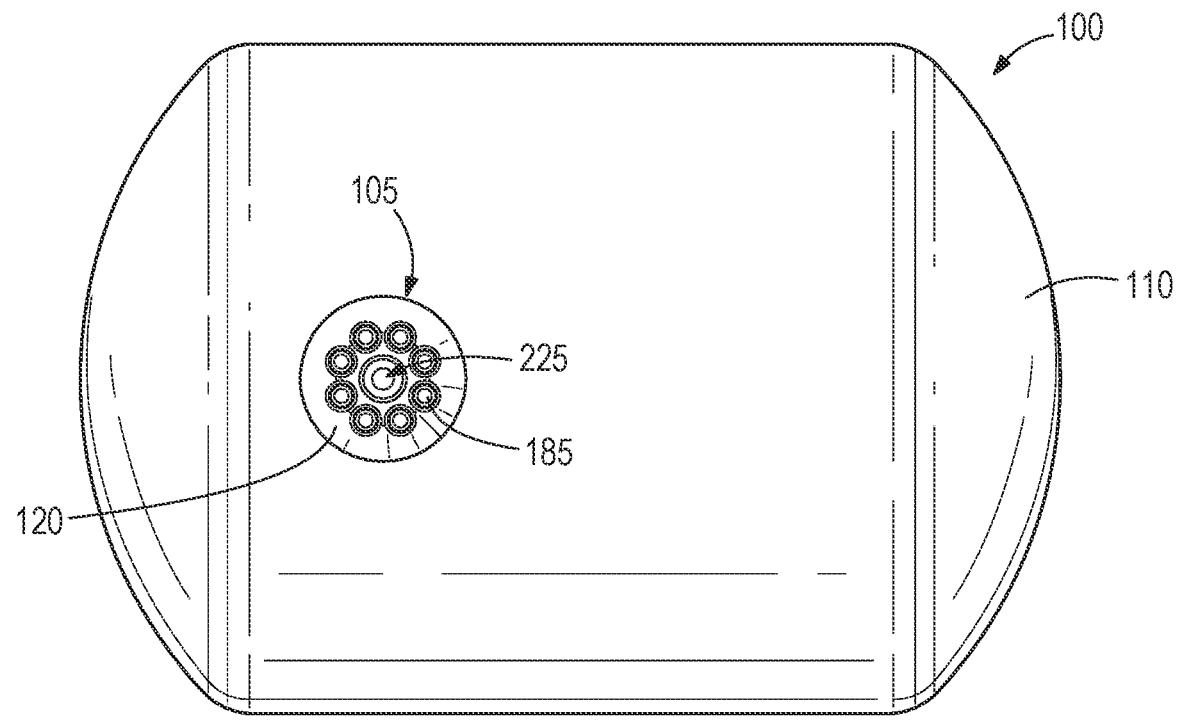
FIG. 4 is a bottom plan view of the fluid restriction system of FIG. 1.
Figure 5:
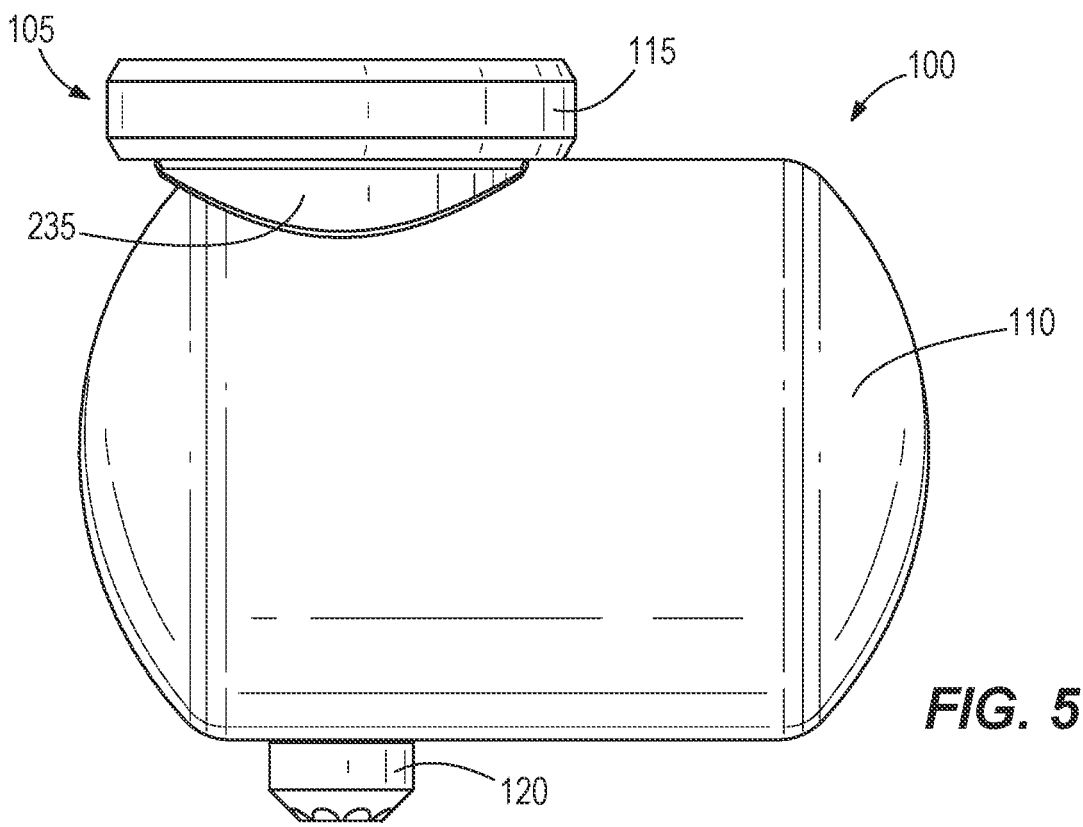
FIG. 5 is a side elevation view of the fluid restriction system of FIG. 1.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

With reference to FIG. 1, a flow restriction system 100 is shown. The flow restriction system 100 includes an anchor 105 and an inflatable plug 110 coupled to the anchor 105. In the illustrated embodiment, the inflatable plug 110 is generally cylindrical when inflated. The inflatable plug 110 can be made of any appropriate combination of materials, such as an inner bladder and a plurality of fabric layers.

The anchor 105 includes a head 115 and a foot 120. In the illustrated embodiment, the head 115 and the foot 120 are on diametrically opposite sides of the inflatable plug 110. As shown in FIG. 1, the head 115 includes an opening 125 defined in the head 115 for allowing an inflation fluid (e.g., air, water, etc.) to pass therethrough and to fill the inflatable plug 110.

Figure 6:
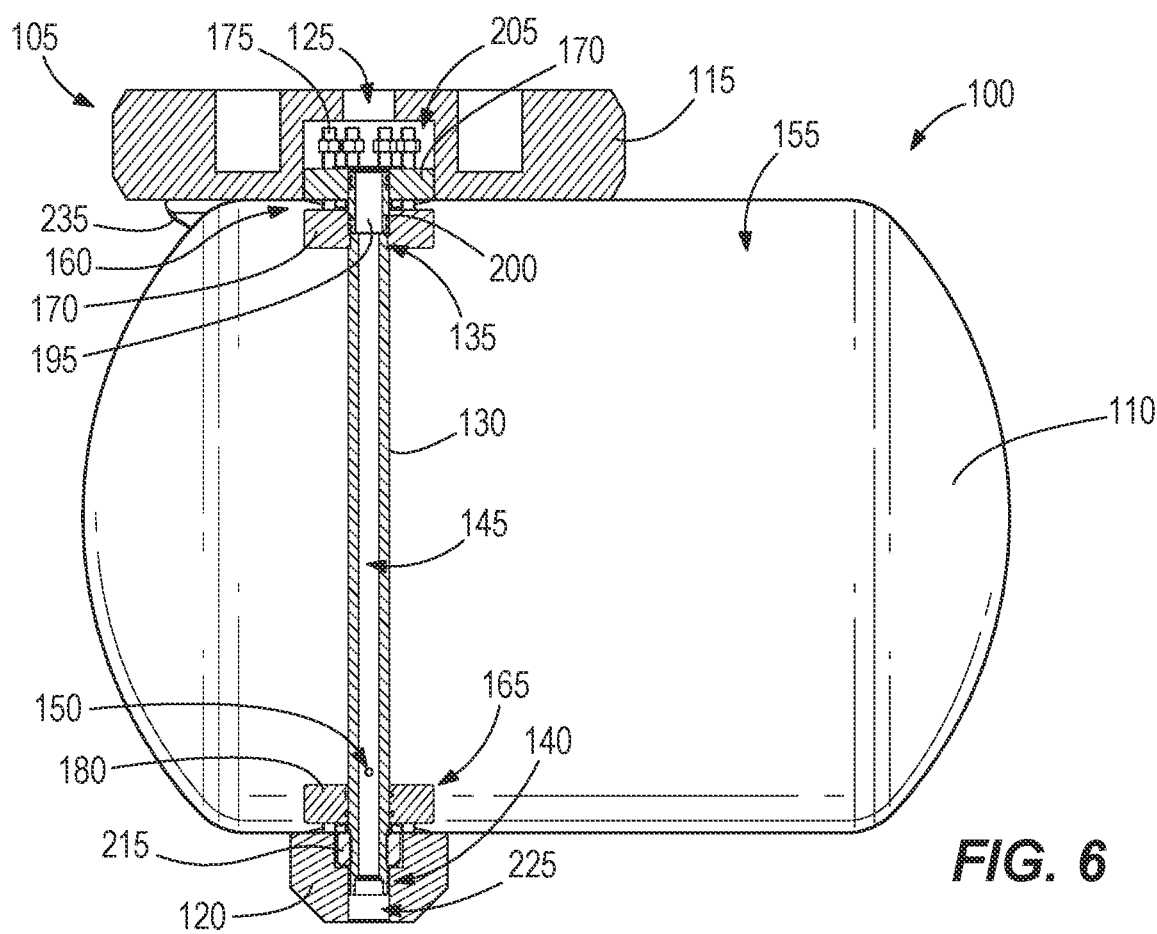
FIG. 6 is a side elevation cross-sectional view of the fluid restriction system of FIG. 1.

As shown in FIG. 6, the anchor 105 further includes an inflation conduit 130. In the illustrated embodiment, the inflation conduit 130 is a rigid conduit. In other embodiments, the inflation conduit 130 may be flexible or sections of the inflation conduit 130 may be flexible. The inflation conduit 130 is coupled to both the head 115 and the foot 120. The inflation conduit 130 includes a first end 135 coupled to the head 115 and a second end 140 coupled to the foot 120. The first end 135 and second end 140 are opposite one another. The inflation conduit 130 extends through the inflatable plug 110 and includes a passage 145 defined in the inflation conduit 130. The passage 145 is in fluid communication with the opening 125 of the head 115. The inflation conduit 130 further includes at least one fluid delivery port 150 fluidly communicating the passage 145 with an interior chamber 155 of the inflatable plug 110. Inflation fluid is delivered through the opening 125 in the head 115, through the passage 145 in the inflation conduit 130, through the fluid delivery port 150, and into the interior chamber 155 of the inflatable plug 110. This inflation fluid may be a gas, a liquid, a slurry, or the like.

Figure 8:
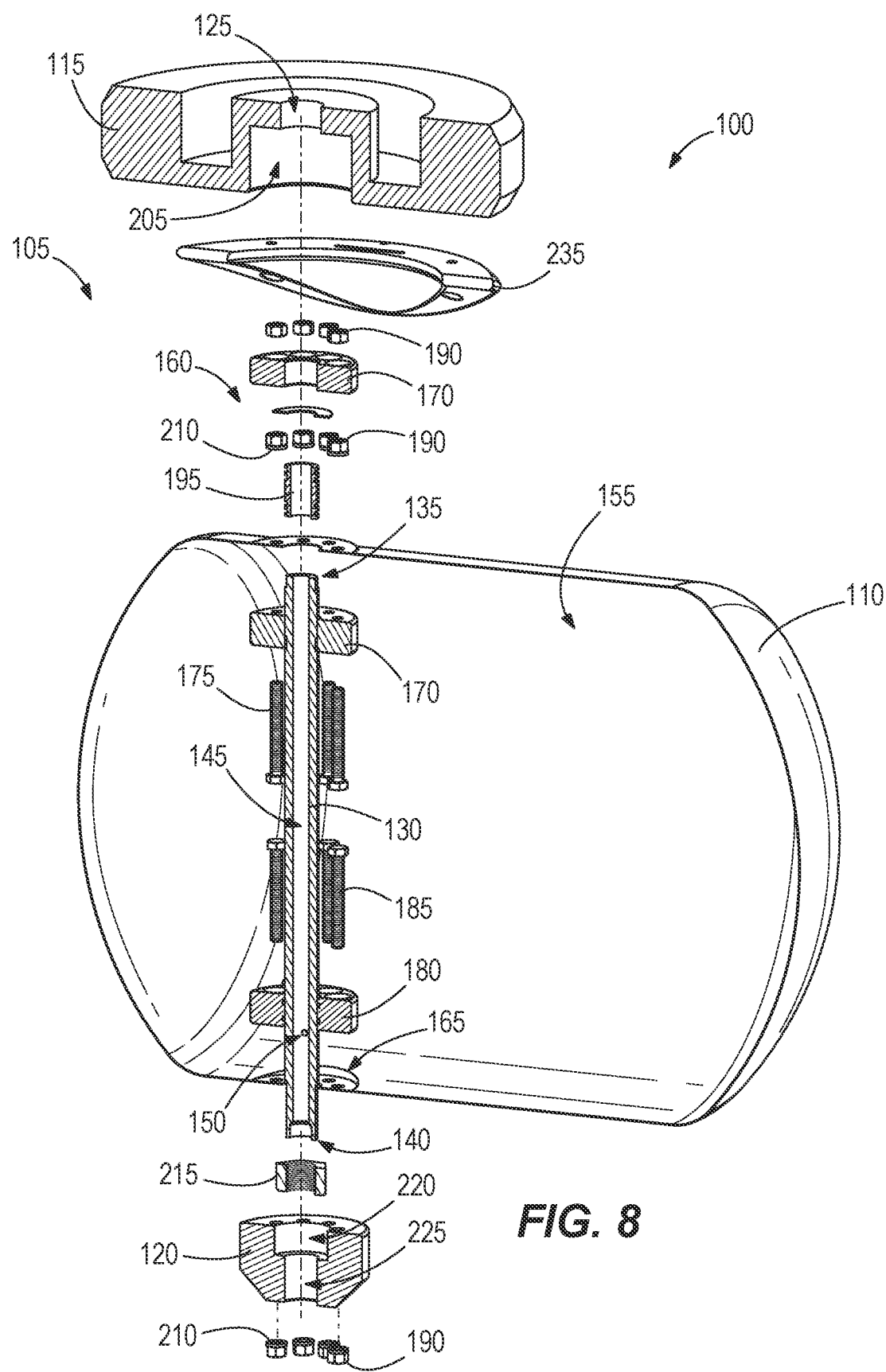
FIG. 8 is an exploded perspective cross-sectional view of the fluid restriction system of FIG. 1.
Figure 9:
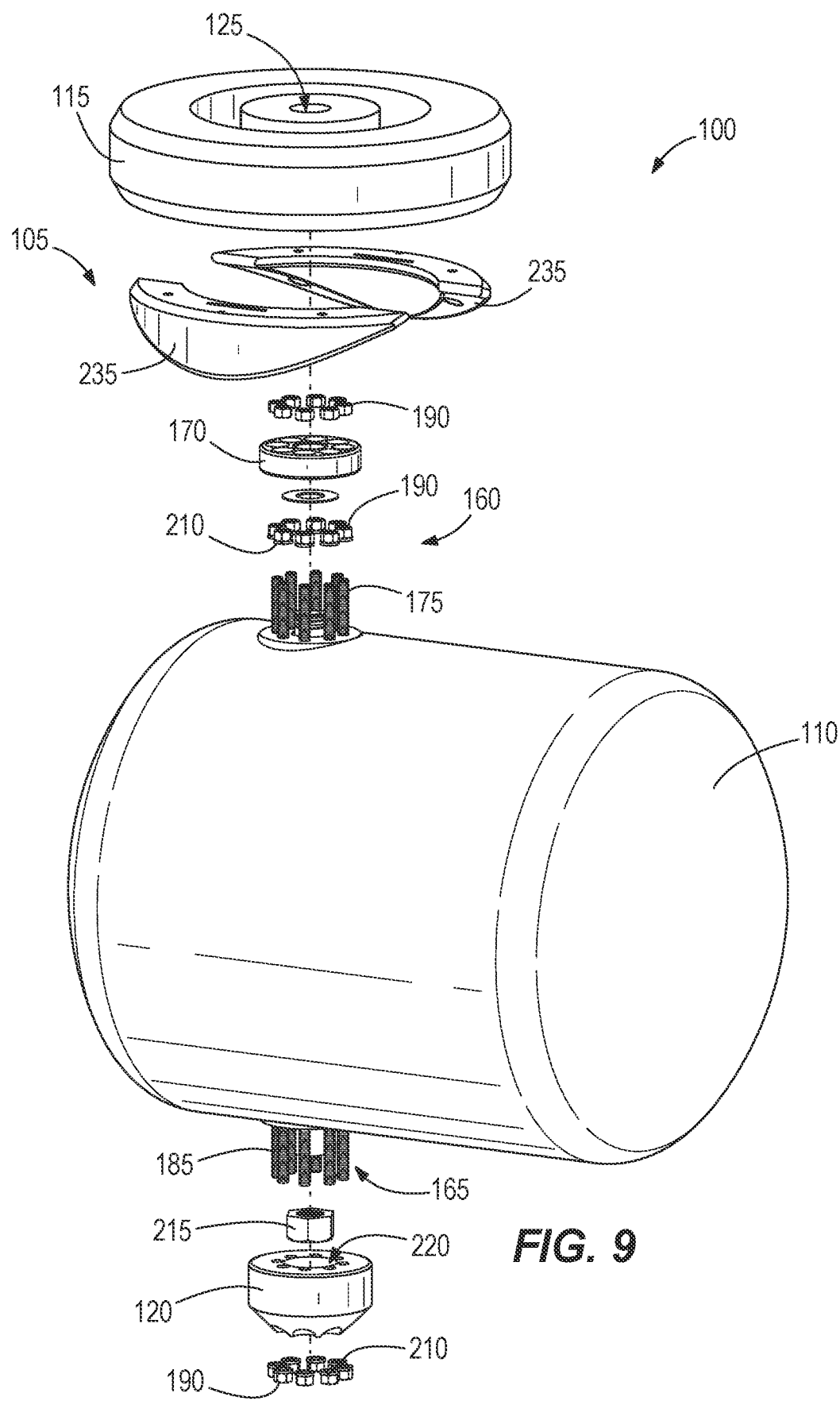
FIG. 9 is an exploded perspective view of the fluid restriction system of FIG. 1.

With reference to FIG. 8, the anchor 105 is shown in an exploded view. Because the anchor 105 extends through the interior chamber 155 and the walls of the inflatable plug 110, each end 135, 140 of the inflation conduit 130 is sealingly coupled to a respective plate assembly 160, 165.

A first plate assembly 160 couples the inflation conduit 130 to the inflatable plug 110 adjacent the head 115. The first plate assembly 160 includes two plates 170 positioned on opposite sides of the wall of the inflatable plug 110. Fasteners 175 couple the two plates 170 to each other to locally compress the one or more layers of the wall of the inflatable plug 110. The fasteners 175 may be, for instance, bolts, screws, rivets, nails, or the like. As such, one of the plates 170 is positioned outside of the inflatable plug 110 while another of the plates 170 is positioned inside the interior chamber 155 of the inflatable plug 110. In the illustrated embodiment, the plates 170 are circular in shape and aligned with one another. The fasteners 175 are positioned along a circumference of the plates 170 and extend through the plates 170 and the wall of the inflatable plug 110. In other embodiments, the plates 170 may be other shapes (e.g., square, octagonal, etc.) and/or may not be aligned with each other.

A second plate assembly 165 couples the inflation conduit 130 to the inflatable plug 110 adjacent the foot 120. The second plate assembly 165 includes a plate 180 coupled to the foot 120 by a plurality of fasteners 185. The plate 180 and the foot 120 are positioned on opposite sides of the wall of the inflatable plug 110. The fasteners 185 couple the plate 180 and the foot 120 such that the one or more layers of the wall of the inflatable plug 110 are locally compressed. The fasteners 185 may be the same as the fasteners 175, or they may be different. The foot 120 is positioned outside the inflatable plug 110 while the plate 180 is positioned inside the interior chamber 155 of the inflatable plug 110. The foot 120 and the plate 180 are illustrated as being circular in shape and aligned with each other. The fasteners 185 are positioned along a circumference of the foot 120 and the plate 180 and extend through the foot 120, the plate 180, and the wall of the inflatable plug 110. As stated above, the plate 180 and the foot 120 may be other shapes and/or may not be aligned with each other. In the illustrated embodiment, each of the fasteners 175, 185 is held in place with a complementary nut 190. In some embodiments, some or all of the nuts 190 may include lock nuts.

Also shown in FIG. 8, a conduit connector 195 is shown. The conduit connector 195 couples to the inflation conduit 130 by, for instance, receiving the first end 135 of the inflation conduit 130 therein. Other embodiments may include the inflation conduit 130 receiving an end of the conduit connector 195 in the first end 135. The inflation conduit 130 and the conduit connector 195 may be threadingly engaged with each other, press fit onto each other, or the like. Still other embodiments may include no conduit connector 195 at all, and instead may include an extension of the inflation conduit 130. As shown in FIG. 6, the conduit connector 195 traverses between the plates 170 of the first plate assembly 160. Sealing rings, such as polymer O-rings, 200 sealingly engage the conduit connector 195 with each of the plates 170 to inhibit filling liquid from escaping the interior chamber 155 of the inflatable plug 110. In embodiments including the conduit connector 195, the conduit connector 195 fluidly communicates the opening 125 in the head 115 with the passage 145 in the inflation conduit 130.

Figure 7:
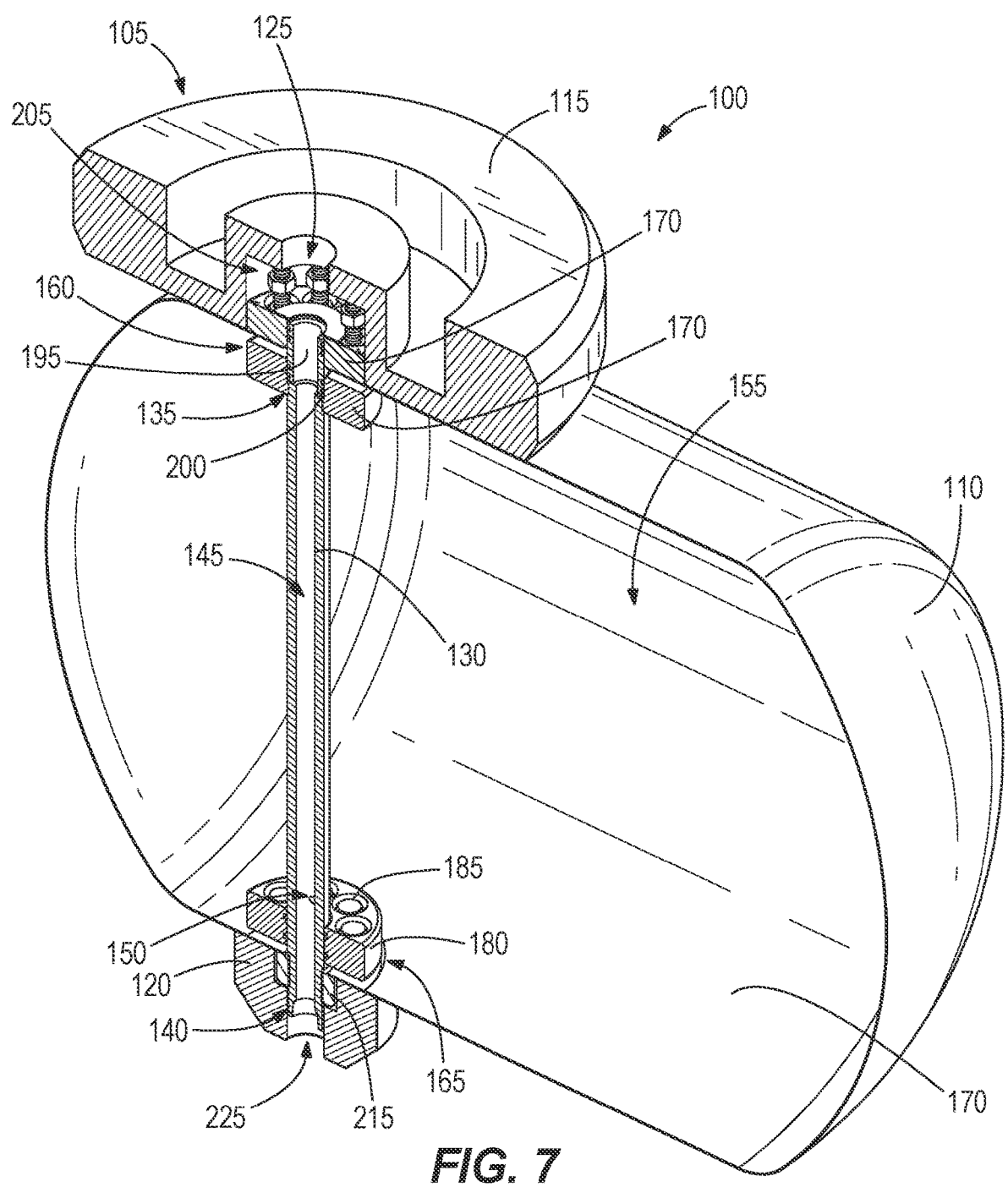
FIG. 7 is a perspective cross-sectional view of the fluid restriction system of FIG. 1.

As shown in FIGS. 6-8, the head 115 further includes a recess 205 defined therein. The recess 205 receives the outer plate 170 of the first plate assembly 160. In some embodiments, the inflation conduit 130 or the conduit connector 195 may extend through the recess 205 and meet the opening 125. In some embodiments, the fasteners 175 and nuts 190 may be made of or coated with a corrosion resistant material or some other material to prevent degradation of the fasteners 175 and nuts 190. Still other embodiments may include no such material. In some embodiments, a ram and ram adapter (not shown) are attached directly to the fasteners 175 and/or nuts 190 in the recess 205 to create an inner seal for the inflation fluids.

Figure 10:
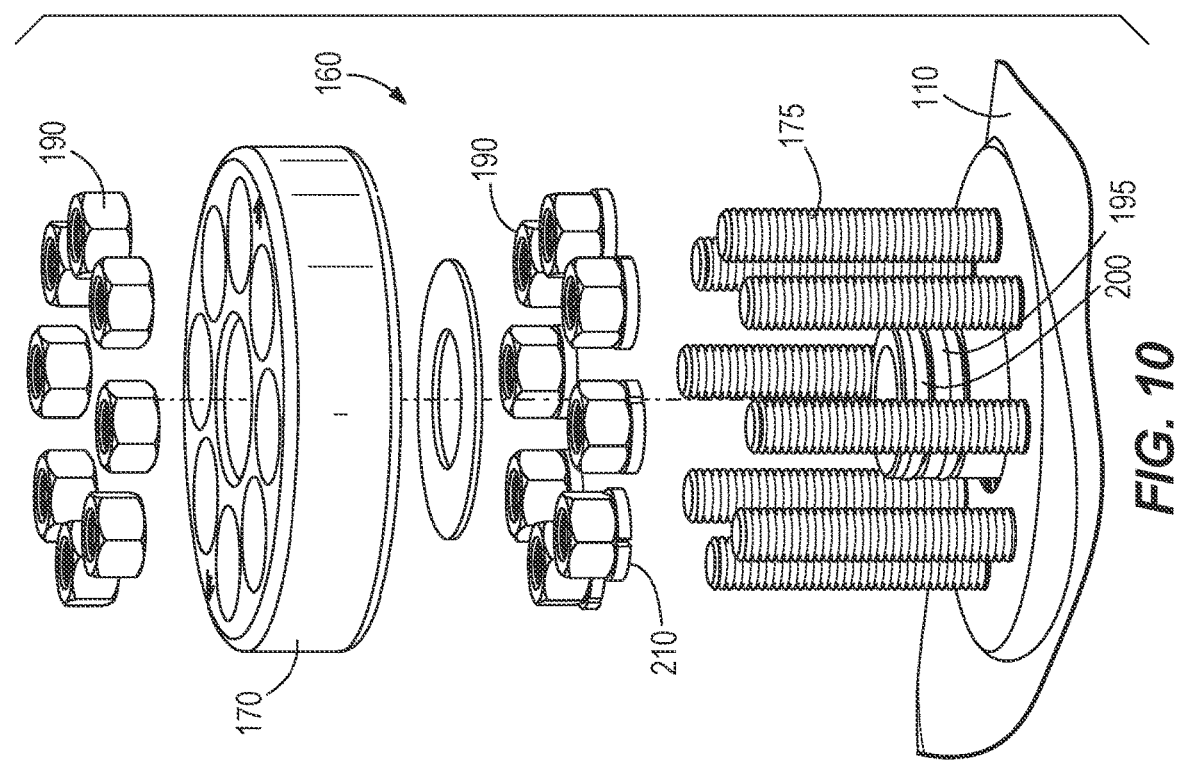
FIG. 10 is a detailed exploded perspective view of a portion of the fluid restriction system of FIG. 1.
Figure 12:
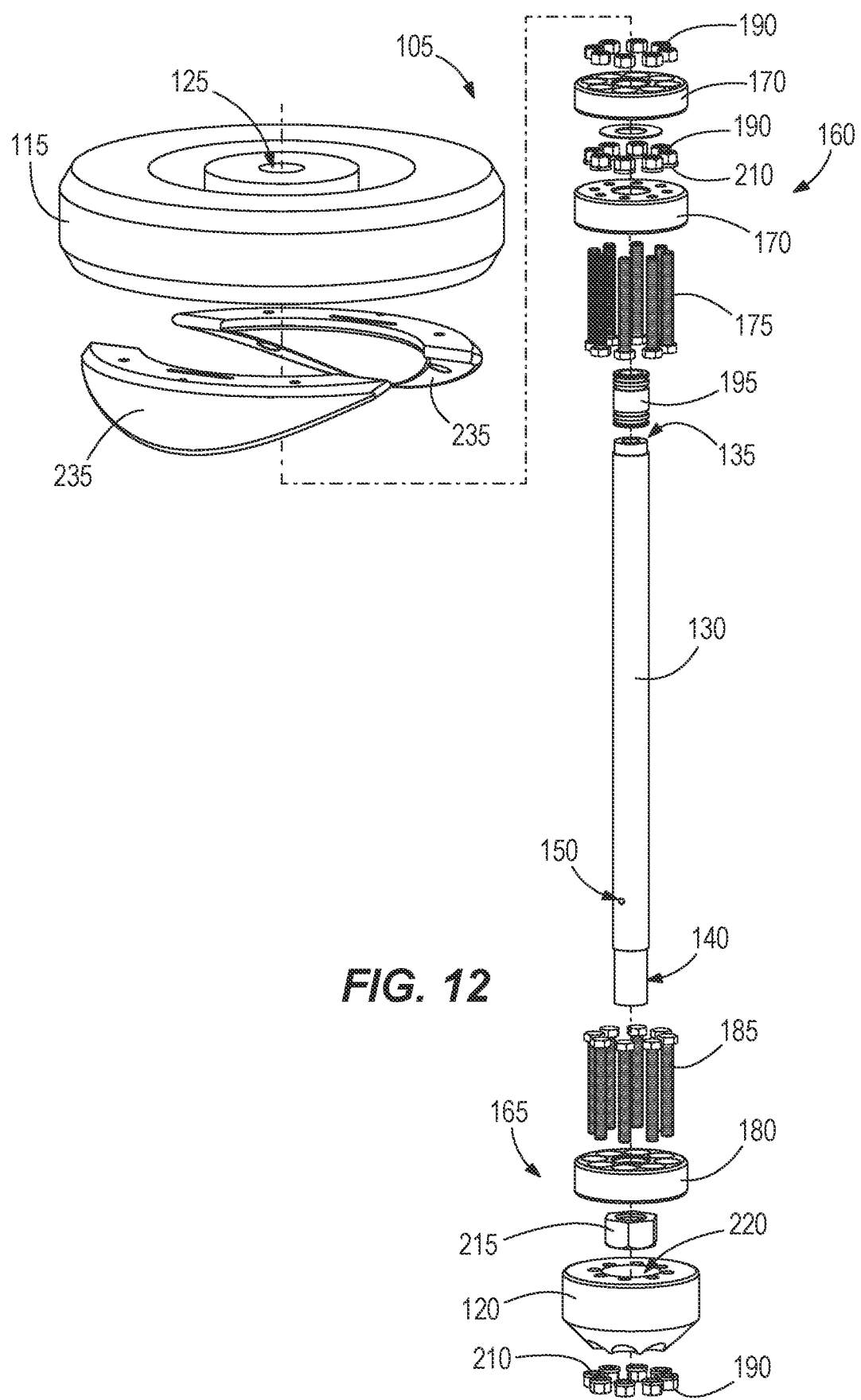
FIG. 12 is an exploded perspective view of an anchor of the fluid restriction system of FIG. 1.

As shown in FIG. 10, a portion of the first plate assembly 160 is shown. The conduit connector 195 is shown protruding upwardly from the inflatable plug 110 to be received in the outer plate 170. Lock washers 210 are provided adjacent at least some of the nuts 190 to maintain the position of the fasteners 175 and, therefore, the plates 170 of the first plate assembly 160.

Figure 11:
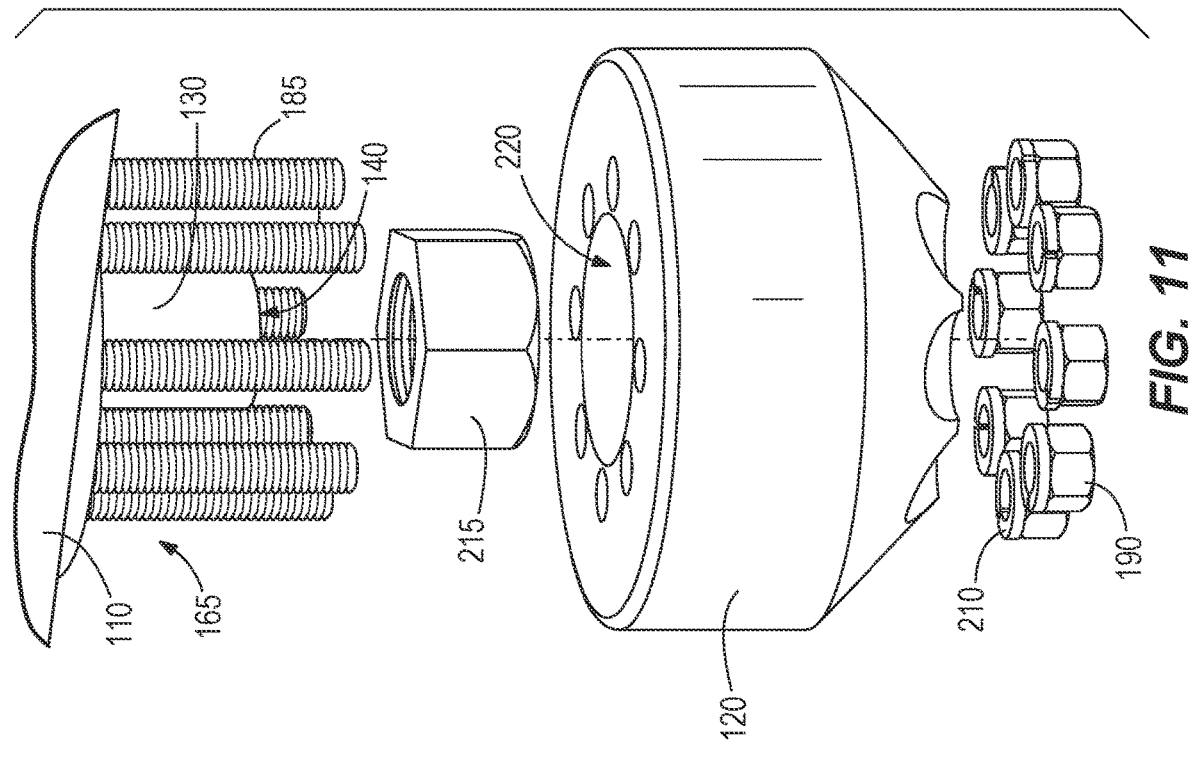
FIG. 11 is a detailed exploded perspective view of another portion of the fluid restriction system of FIG. 1.

With reference to FIG. 11, the foot 120 and a portion of the second plate assembly 165 are shown. The second plate assembly 165 in the illustrated embodiment includes a conduit nut 215 configured to receive the second end 140 of the inflation conduit 130. The conduit nut 215 may be threadingly received on the second end 140 of the inflation conduit 130. The conduit nut 215 prevents the second end 140 of the inflation conduit 130 from retracting into the interior chamber 155 of the inflatable plug 110. The foot 120 includes a recess 220 defined therein. The recess 220 receives at least one of the conduit nut 215 and the second end 140 of the inflation conduit 130. In some embodiments, the recess 220 is shaped such that the conduit nut 215 is free to rotate therein. In other embodiments, the recess 220 may be shaped to trap the conduit nut 215 rotationally. In still other embodiments, the conduit nut 215 and the foot 120 may be permanently affixed to each other, integrally molded as a single part, or the like.

With reference to FIG. 8, at least one of the inflation conduit 130, the conduit nut 215, and the foot 120 may have a closed end such that inflation liquid does not escape from the inflation conduit 130 except to fill the inflatable plug 110. In some embodiments, a plug may be positioned in one or more of the inflation conduit 130, the conduit nut 215, and the foot 120 to maintain pressure in the inflatable plug 110.

Figure 13:
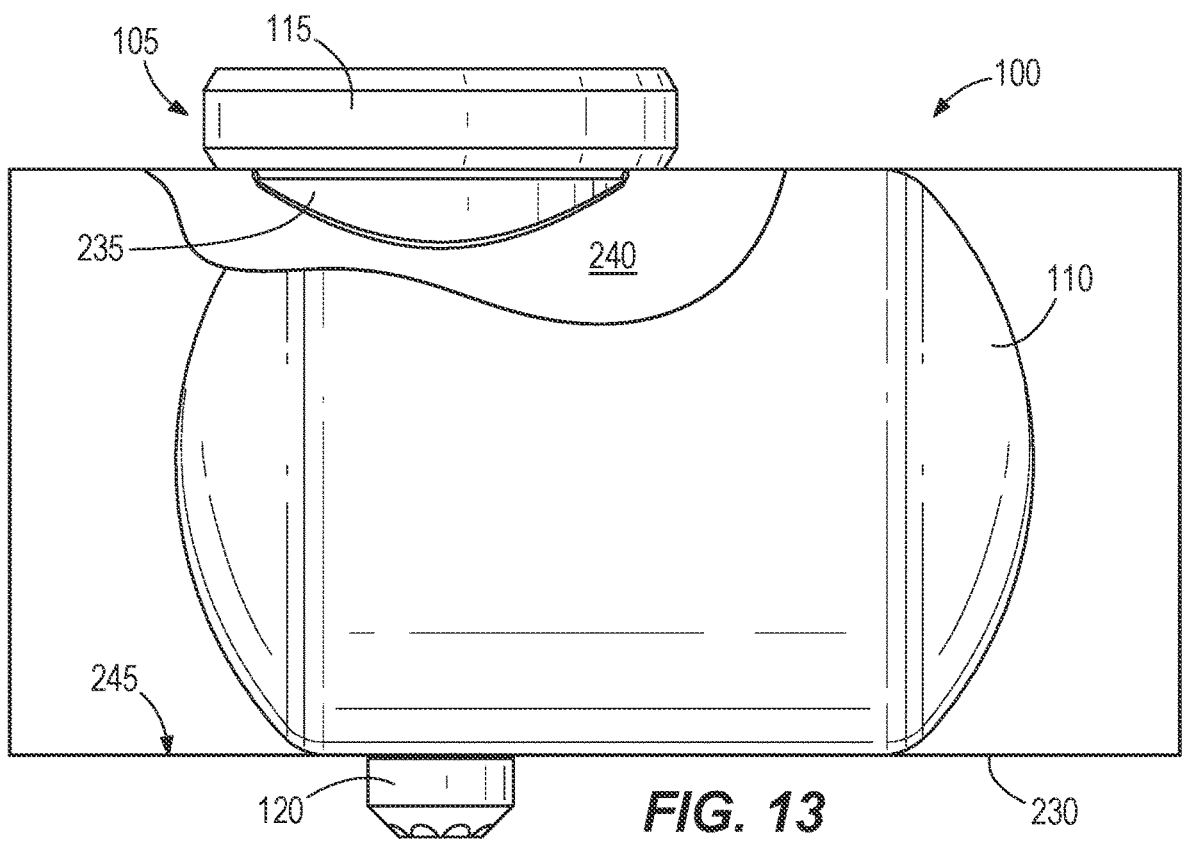
FIG. 13 is a side elevation view of the fluid restriction system of FIG. 1 placed in a pipe in a first configuration.

As shown in FIG. 13, the flow restriction system 100 may be placed in a pipe 230. In the manner of affixing the flow restriction system 100 in the pipe 230 as shown in FIG. 13, at least a portion of the flow restriction system 100 is inserted through an insertion tap (a hole through the wall of the pipe 230 on the top of the pipe in FIG. 13). A hot tap is also created in the pipe (another smaller hole through the wall of the pipe 230 on the bottom of the pipe in FIG. 13) diametrically opposite of the insertion tap. The head 115 is located outside the pipe 230 adjacent the insertion tap. In some embodiments, the flow restriction system 100 further includes one or more saddle members 235 configured to surround at least a portion of the outer surface 240 of the pipe 230 to distribute the forces transmitted to the pipe 230 by the flow restriction system 100. The foot 120 is located outside the pipe 230 within the hot tap sleeve. In this configuration, the rigid connection of the head 115 to the foot 120 via the inflation conduit 130 and other components offers significant stability for the flow restriction system 100. As such, higher flow rates can be blocked than has been previously possible. This improvement is due, in part, to the anchor 105 of the flow restriction system 100 engaging the pipe 230 at two locations instead of just one.

Figure 14:
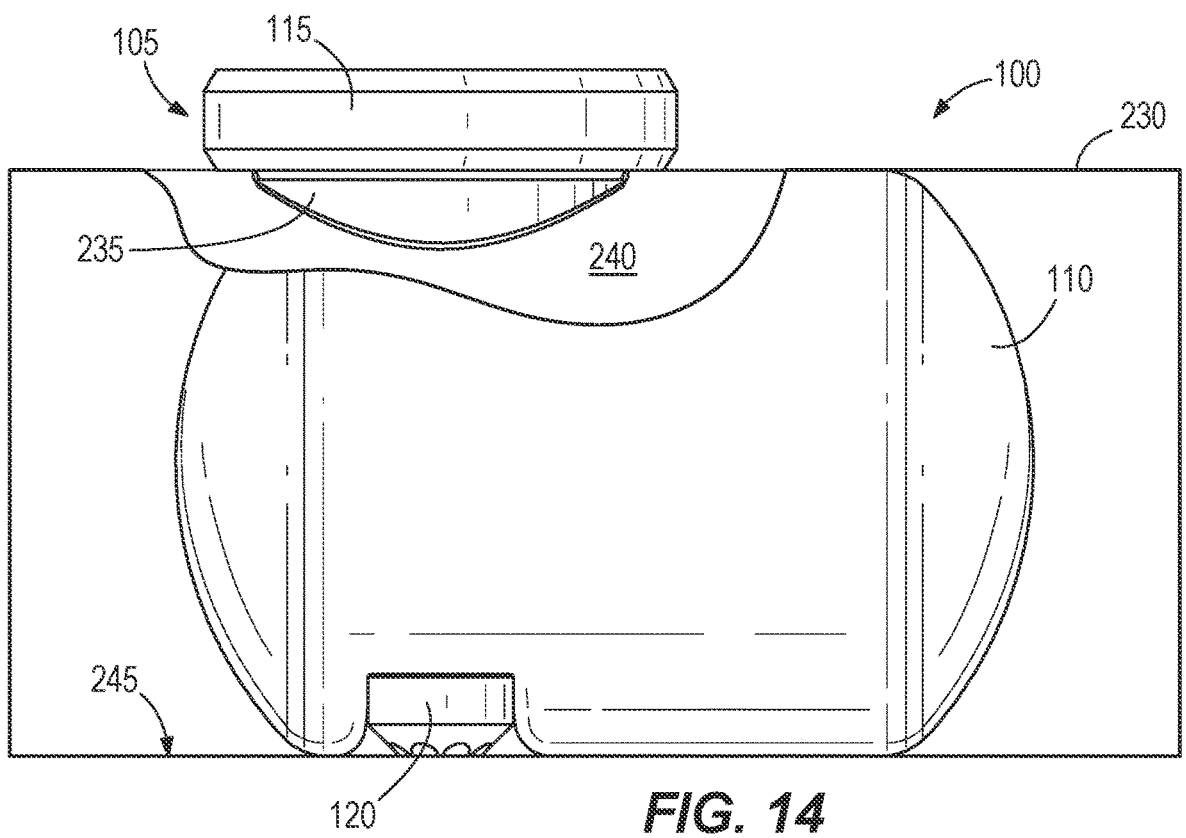
FIG. 14 is a side elevation view of the fluid restriction system of FIG. 1 placed in a pipe in a second configuration.
Figure 15:
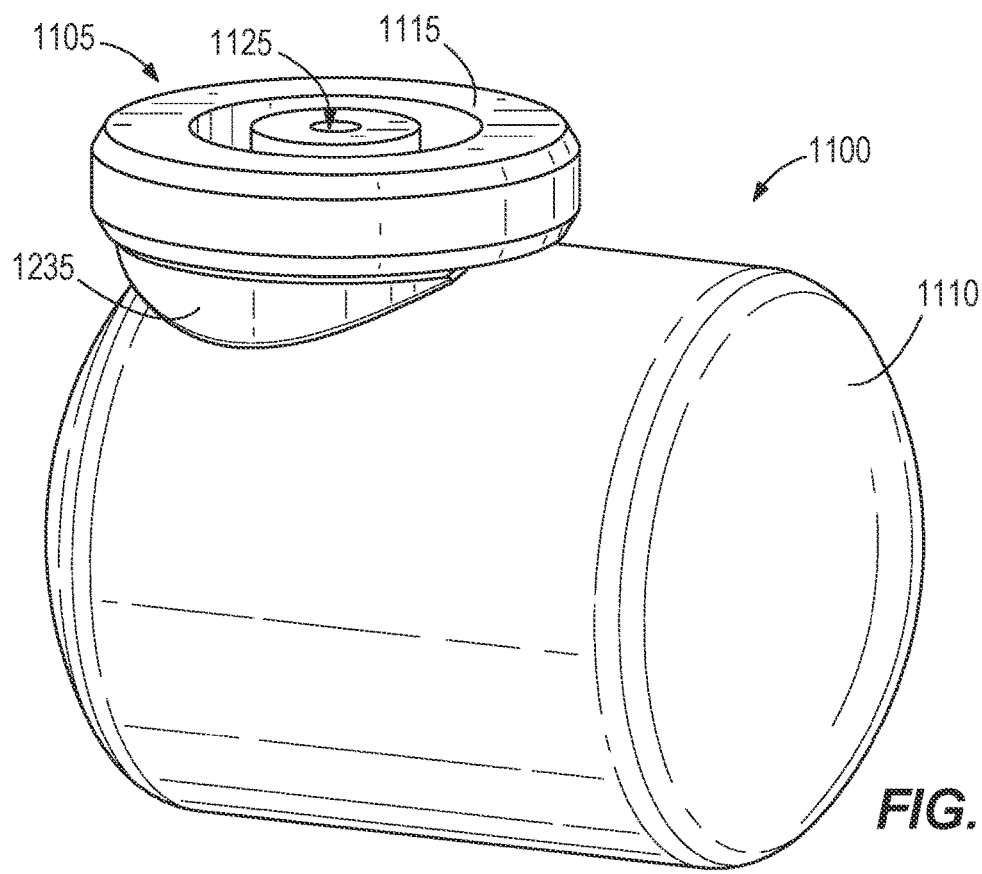
FIG. 15 is a perspective view of another embodiment of a fluid restriction system
Figure 16:
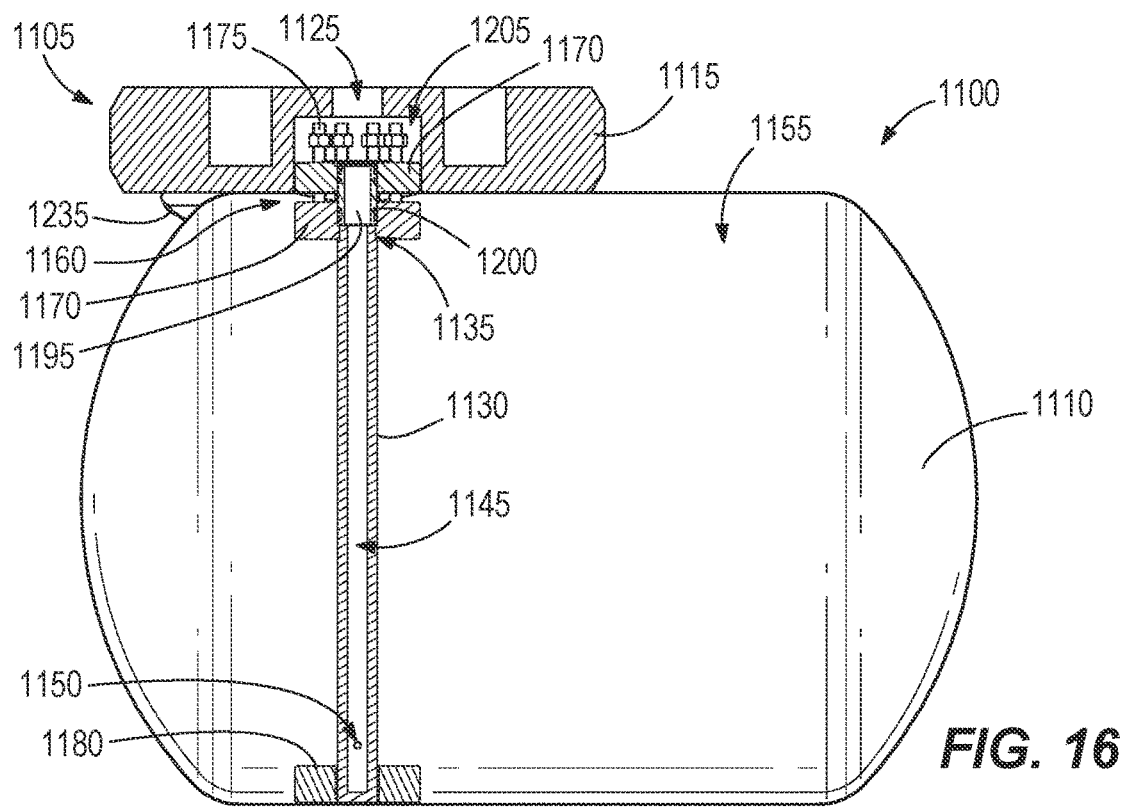
FIG. 16 is a side elevation cross-sectional view of the fluid restriction system of FIG. 15.
Figure 17:
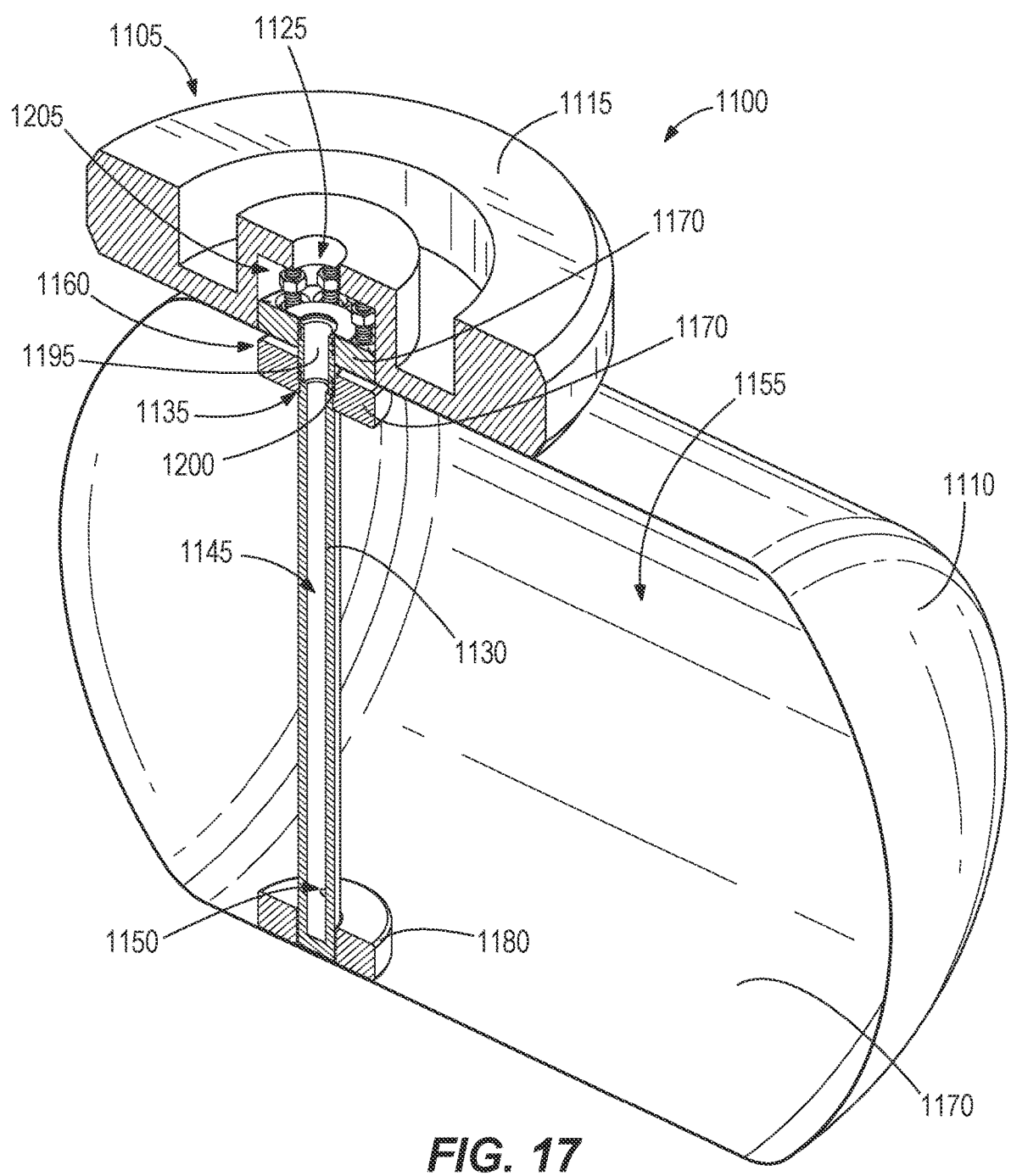
FIG. 17 is a perspective cross-sectional view of the fluid restriction system of FIG. 15.
Figure 18:
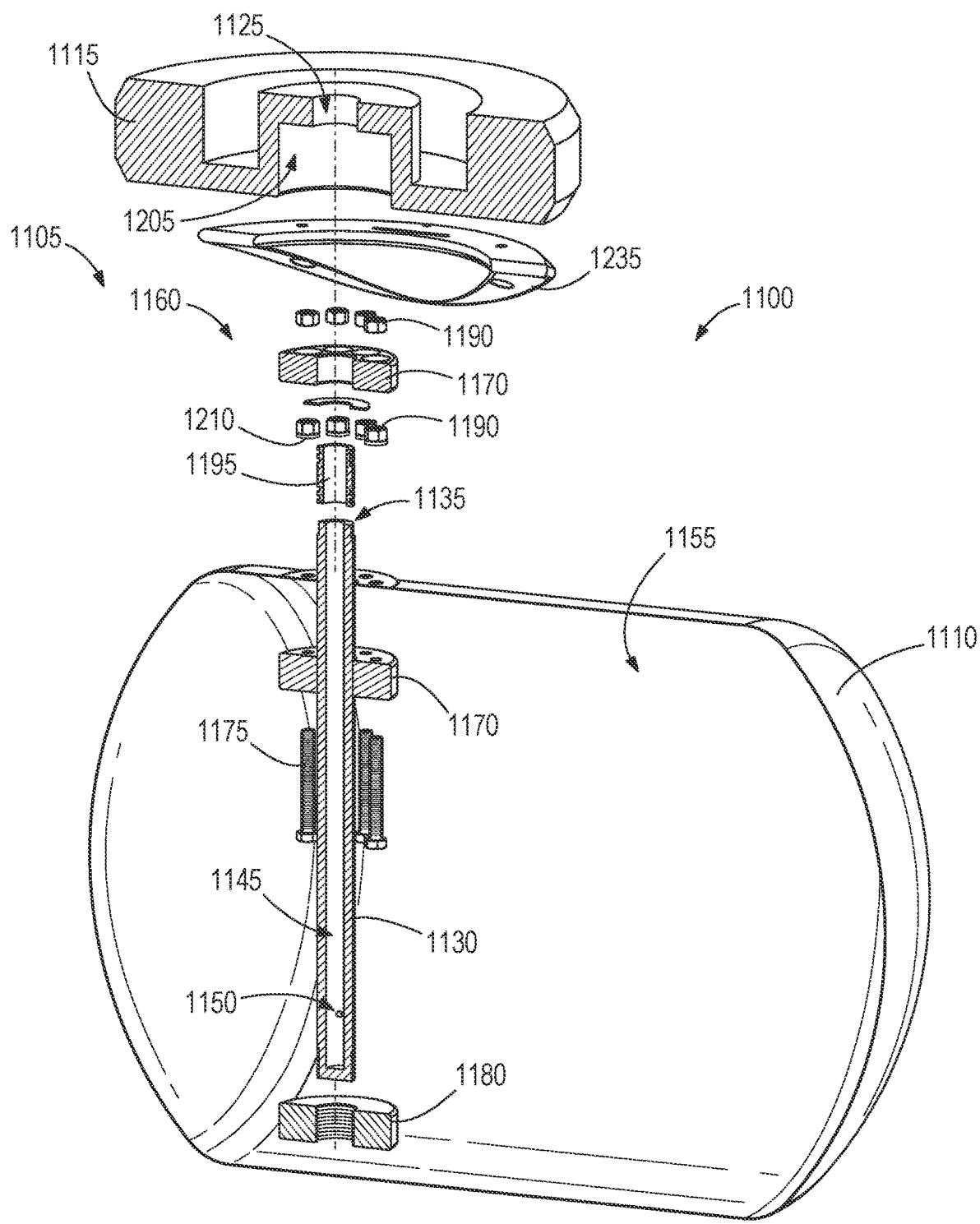
FIG. 18 is an exploded perspective cross-sectional view of the fluid restriction system of FIG. 15.

As shown in FIG. 14, the flow restriction system 100 may be placed in a pipe 230 in an alternative fashion. In the configuration of FIG. 14, only an insertion tap (a hole through the wall of the pipe 230 on the top of the pipe in FIG. 14) is required. The flow restriction system 100 is inserted via the insertion system. As discussed above, the head 115 is located outside of the pipe 230 adjacent the insertion tap, and one or more saddle members 235 may be used to engage a portion of the outer surface 240 of the pipe 230. The foot 120 is positioned to engage an inner surface 245 of the pipe 230. In some embodiments, the foot 120 may include a textured end or some other configuration to facilitate the engagement of the foot 120 with the inner surface 245 of the pipe 230. In the configuration of FIG. 14, the anchor 105 is adjusted such that the foot 120 is pressed into the inner surface 245 of the pipe 230 with sufficient force to offer another point of stability for the anchor 105 beyond the engagement of the pipe 230 at the insertion tap. In such embodiments, the inflatable plug 110 is made of one or more materials that are flexible enough to extend beyond at least a portion of the foot 120 in order to at least partially seal off the pipe 230. The engagement of the pipe 230 by friction at the foot 120 and by passing through the wall of the pipe 230 adjacent the head 115 also allows for significant stability for the flow restriction system 100. Higher flow rates can be blocked than has been previously possible.

The pipe 230 can be any appropriate pipe to be serviced or repaired. The pipe 230 may be, for example, a sewer line, a water main, an oil pipeline, a gas line, or any other conduit suitable for transporting fluids. A pipe branch, nozzle, or hot tap sleeve is configured to couple to the pipe 230 or already is coupled to the pipe 230 at the insertion tap and/or the hot tap. A hot tap sleeve may be bolted or welded to the pipe 230 in many embodiments. A tapping valve may be coupled to the hot tap sleeve to allow selective access into the pipe 230 through the insertion tap and/or hot tap. A bypass tee may also be attached to the tapping valve to allow flow to continue past the plugged pipeline section. In some embodiments, a launch cylinder may be coupled to the hot tap sleeve to help guide and direct the flow restriction system 100 into the pipe 230.

With reference to FIGS. 15-19, another embodiment of a flow restriction system 1100 is shown. Many features of the flow restriction system 1100 are similar to those described above with regard to the flow restrictions system 100 of FIGS. 1-14. For the sake of brevity, similar features will not be discussed again below, but these similar features of the flow restriction system 1100 will have reference numbers that are a value of one thousand higher than the corresponding features of the flow restriction system 100 described above. For example, the flow restriction system 1110 includes an anchor 1105, an inflatable plug 1110 having an interior chamber 1155, a head 1115, an opening 1125 defined in the head 1115, a plate assembly 1160 having two plates 1170, fasteners 1175, an inflation conduit 1130 having a first end 1135 and a fluid delivery port 1150, a passage 1145 defined in the inflation conduit 1130, a plate 1180, nuts 1190, a conduit connector 1195, a recess 1205 defined in the head 1115, sealing rings 1200, lock washers 1210, and one or more saddle members 1235 configured to surround at least a portion of an outer surface 1240 of a pipe 1230.

The flow restriction system 1100 may include the inflation conduit 1130 coupled with the plate 1180. In some embodiments, the inflation conduit 1130 may be permanently coupled with the plate 1180, but the illustrated embodiment shows the inflation conduit 1130 threadingly engaged with the plate 1180 for removable coupling. The inflation conduit 1130 is rigid in the illustrated embodiment, and provides stability to the flow restriction system 1100 at two diametrically opposed locations within the pipe 1230. Specifically, the anchor 1105 couples to the pipe 1230 similar to the manner discussed above with regard to the flow restriction system 100 of FIGS. 1-14, and the plate 1180 and inflation conduit 1130 press against the inner surface 1245 of the pipe 1230 with the wall of the inflatable plug 1110 disposed therebetween. Stated another way, the first plate assembly 1160 is located on two respective sides of the inflatable plug 1110 while the plate 1180 at the opposite end of the inflation conduit 1130 is only on the inner side of the inflatable plug 1110. The rigid inflation conduit 1130 allows for the end of the inflation conduit 1130 and/or the plate 1180 to be pressed against the inner surface 1245 and the wall of the inflatable plug 1110. In some embodiments, the inflation conduit 1130 can be extended farther into the inflatable plug 1110 relative to the head 1115 (and/or first plate assembly 1160) by, for instance, rotating the inflation conduit 1130 to threadingly advance the inflation conduit 1130. This adjustability allows a user to determine when to fully secure the flow restriction system 1100 in the pipe 1230. In some embodiments, the plate 1180 and/or the end of the inflation conduit 1130 are not secured to the wall of the inflatable plug 1110 and simply rest on the inner surface thereof. Other embodiments may allow for removable or permanent coupling between the inflatable plug 1110 and the inflation conduit 1130 and/or plate 1180. The plate 1180 is provided in some embodiments to distribute the force on the wall of the inflatable plug 1110 provided by the rigidity of the inflation conduit 1130. Because no separate foot is provided in this embodiment like the foot 120 described above, the plate 1180 and/or the end of the inflation conduit 1130 should be considered the foot in this embodiment.

Various features and advantages of the disclosure are set forth in the following claims.

What is claimed is:

1. A flow restriction system for restricting fluid flow through a pipe, the flow restriction system comprising:
    an anchor including:
        an inflation conduit having
            a first end,
            a second end opposite the first end, and
            a passage extending from the first end toward the second end,
        a head coupled to the first end of the inflation conduit, the head including a bottom surface configured to face an outer surface of the pipe and an opening in fluid communication with the passage, and
        a foot coupled to the second end of the inflation conduit;
    an inflatable plug coupled to the anchor, the inflatable plug including an interior chamber, the interior chamber in fluid communication with the passage;
    a saddle member positioned between the bottom surface of the head and the outer surface of the pipe, the saddle member configured to engage the outer surface of the pipe; and
    wherein the head and the foot are configured to engage diametrically opposed sections of the pipe.

2. The flow restriction system of claim 1, wherein
    the inflatable plug has a generally cylindrical inflated shape including a diameter, and
    the inflation conduit extends through the diameter of the inflatable plug.

3. The flow restriction system of claim 1, wherein the inflation conduit is rigid.

4. The flow restriction system of claim 1, wherein each of the head and the foot is at least partially disposed outside of the interior chamber of the inflatable plug.

5. The flow restriction system of claim 4, wherein
    the anchor further includes a first plate assembly and a second plate assembly,
    the first plate assembly is disposed on opposite sides of a wall of the inflatable plug, the first plate assembly disposed adjacent the head, and
    the second plate assembly is disposed on opposite sides of the wall of the inflatable plug, the second plate assembly including a plate coupled to the foot.

6. The flow restriction system of claim 4, wherein a portion of the inflation conduit extends through a wall of the inflatable plug.

7. The flow restriction system of claim 1, wherein the inflation conduit further includes at least one fluid delivery port fluidly communicating the passage with the interior chamber of the inflatable plug.

8. The flow restriction system of claim 1, wherein
    the foot is formed by a plate coupled to the second end of the inflation conduit, and
    the entirety of the foot is disposed within the interior chamber of the inflatable plug.

9. The flow restriction system of claim 8, wherein the plate is removably coupled to the second end of the inflation conduit.

10. The flow restriction system of claim 9, wherein the plate is threadingly coupled to the second end of the inflation conduit.

11. The flow restriction system of claim 1, wherein the inflation conduit is offset from a center of the inflatable plug.

12. The flow restriction system of claim 1, wherein the saddle member is a first saddle member, wherein the flow restriction system further comprises a second saddle member, and wherein the first and second saddle members are positioned on opposing sides of a longitudinal plane extending through the inflation conduit and the head.

13. A flow restriction system for restricting fluid flow through a pipe, the flow restriction system comprising:
    an anchor including:
        a rigid elongate inflation conduit having
            a first end,
            a second end opposite the first end,
            a passage extending from the first end toward the second end, and
            at least one fluid delivery port defined in a wall of the inflation conduit between the first end and the second end,
        a generally circular head removably coupled to the first end of the inflation conduit, the head including a circular opening in fluid communication with the passage, the circular opening having a center point that is coincident with a center point of the generally circular head, the head configured to be disposed outside of the pipe, and
        a foot removably coupled to the second end of the inflation conduit;
    an inflatable plug coupled to the anchor adjacent the head by a plate assembly with a plurality of fasteners extending through the inflatable plug, the inflatable plug including an interior chamber, the interior chamber in fluid communication with the passage through the at least one fluid delivery port; and
    wherein the head and the foot are configured to engage diametrically opposed sections of the pipe, and
    wherein the head defines a recess that receives a portion of the plate assembly and portions of the plurality of fasteners.

14. The flow restriction system of claim 13, wherein the recess of the head is fluidly connected to the circular opening of the head.

15. The flow restriction system of claim 13, wherein the recess is defined by a sidewall and an end wall of the head, wherein the circular opening extends through the end wall, and wherein the end wall is spaced apart from the plate assembly.

* * * * *